United States Patent [19]

Bernstein

[11] 4,128,739

[45] Dec. 5, 1978

[54] FRONT TAP SHOE FOR MOUNTING ON TEST BLOCK FOR TELEPHONE CONDUCTOR PAIRS

[75] Inventor: Albert Bernstein, Santa Monica, Calif.

[73] Assignee: Communications Technology Corporation, Los Angeles, Calif.

[21] Appl. No.: 832,886

[22] Filed: Sep. 13, 1977

[51] Int. Cl.[2] ........................ H01R 13/44; H04M 3/22

[52] U.S. Cl. .................................. 179/1 PC; 179/175; 339/42; 339/255 R

[58] Field of Search ............... 179/175, 1 PC; 339/42, 339/151 B, 254 R, 255 R, 150 B

[56] References Cited

U.S. PATENT DOCUMENTS

| | | | |
|---|---|---|---|
| 3,275,971 | 9/1966 | King | 339/151 B |
| 3,519,975 | 7/1970 | Prow et al. | 339/42 |
| 3,575,684 | 4/1971 | McIntyre | 339/42 |
| 3,710,046 | 1/1973 | Anderson | 339/150 B |
| 3,736,387 | 5/1973 | Thompson et al. | 179/1 PC |
| 3,781,758 | 12/1973 | Anderson | 339/255 R |

*Primary Examiner*—Douglas W. Olms
*Attorney, Agent, or Firm*—Harris, Kern, Wallen & Tinsley

[57] ABSTRACT

A front tap shoe for mounting on a test block which bridges telephone conductor pairs each terminating at one end at a subscriber's location and at the other end at a central office. The shoe comprises a generally rectangular housing having ends and having front and rear sides, and provided at its ends with clamps for engagement with the test block. The clamps are provided with two degrees of freedom relative to the housing of the shoe. The shoe is provided on the front side of its housing with two parallel rows of contact pins respectively engageable with the electrical contacts of two of the rows of such contacts on the test block. A retractable guide plate protects the ends of the contact pins when they are not in engagement with the electrical contacts on the test block.

4 Claims, 7 Drawing Figures

FRONT TAP SHOE FOR MOUNTING ON TEST BLOCK FOR TELEPHONE CONDUCTOR PAIRS

BACKGROUND OF INVENTION

The present invention relates in general to a front tap shoe for mounting on a test block for telephone conductor pairs. The test block serves as a test field for subscribers' telephones and bridges telephone conductor pairs each terminating at one end at the subscriber's location and at the other end at the central office. Conductor or line pair integrity can be electrically checked at the test block location by applying the front tap shoe of the invention to the test block, with the shoe connected to a "verifier", or other cable verification test equipment. Line pair verification is then performed in the conventional manner by verifier rotary switch line selection and subsequent line monitoring.

Generally relevant prior art includes U.S. Pat. No. 3,736,387, issued May 29, 1973 to John T. Thompson and George W. Gillemot. This patent discloses a shoe which, although intended for use with a central office terminal board instead of a test block, is similar to the shoe of the present invention in some respects and is clamped in place in a somewhat similar manner.

OBJECTS AND SUMMARY OF INVENTION

A general object of the invention is to provide a front tap shoe having parallel rows of contact pins respectively engagable with corresponding rows of electrical contacts on a telephone circuit test block, or the like, and having a retractable guide plate for protecting the ends of the contact pins when not in engagement with the electrical contacts on the test block.

More particularly, the invention may be summarized as including, and an important object of the invention is to provide a front tap shoe which includes: a generally rectangular housing having a front side provided with two parallel rows of contact pins respectively engagable with the electrical contacts of two of a plurality of rows of such contacts on the test block; a retractable guide plate overlying the front side of the housing and having parallel rows of openings respectively receiving the rows of contact pins; and means for biasing the guide plate forwardly relative to the housing from a retracted position to an extended position wherein it protects the ends of the contact pins.

Another important object in connection with the foregoing is to provide the guide plate with two parallel channels respectively having therein the rows of openings for the rows of contact pins, such channels receiving and protecting the ends of the contact pins in the extended position of the guide plate.

Another general and important object of the invention is to provide a front tap shoe capable of being mounted on a test block by means of spring loaded clamps having pivotal and translational degrees of freedom relative to the housing of the shoe.

More particularly, the invention contemplates a front tap shoe, for mounting on a test block for telephone conductor pairs, or the like, which comprises a generally rectangular housing having ends and having front and rear sides, the shoe being provided at its ends with clamps for engagement with the test block.

The invention may be further summarized as including, and another object is to provide a clamp which includes: an L-shaped member having a first arm adjacent and overlying the corresponding end of the housing and terminating in a hook, and having a second arm overlying and spaced from the rear side of the housing; mounting means connecting the L-shaped member to the housing and providing for pivotal movement of the member relative to the housing about a tranverse axis paralleling the intersection of the rear side of the housing and corresponding end of the housing, and for translational movement of the member relative to the housing in a direction generally parallel to the corresponding end of the housing; spring means between the second arm of the L-shaped member and the rear side of the housing for biasing the first arm of the member toward the corresponding end of the housing and for biasing the second arm of the member away from the rear side of the housing; and screw means carried by the second arm of the L-shaped member and engagable with the rear side of the housing.

Another object is to provide a front tap shoe of the foregoing nature wherein the mounting means for each of the L-shaped members includes pin means carried by the member and slot means carried by the housing and extending generally parallel to the corresponding end of the housing.

The foregoing objects, advantages, features and results of the present invention, together with various other objects, advantages, features and results which will be evident to those skilled in the art in the light of this disclosure, may be achieved with the exemplary embodiment of the invention illustrated in the accompanying drawings and described in detail hereinafter.

DESCRIPTION OF EXEMPLARY EMBODIMENT OF INVENTION

Figure 1:
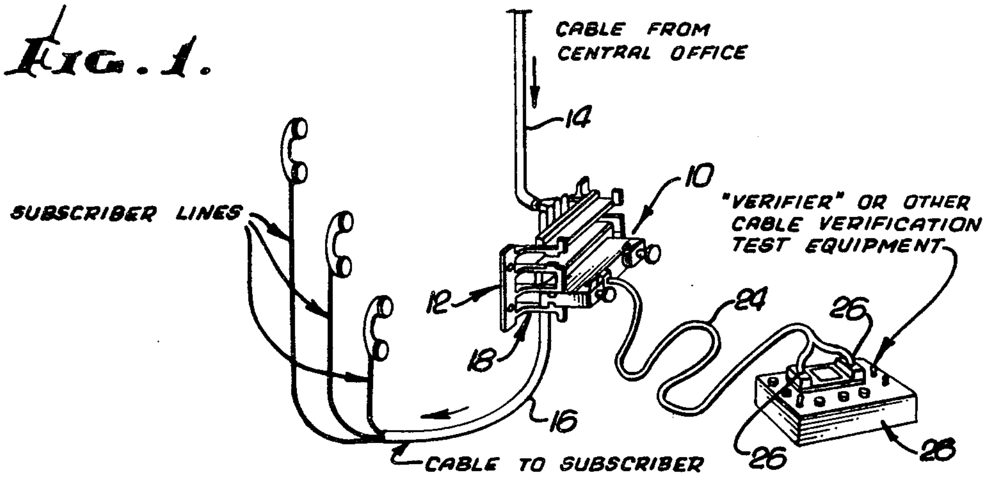
FIG. 1 is a semidiagrammatic view illustrating the front tap shoe of the invention as mounted on a test block.

Referring initially to FIG. 1 of the drawings, the front tap shoe of the invention is designated generally therein by the numeral 10 and is shown as mounted on a test block 12 which bridges telephone conductor or line pairs in a central office cable 14 and corresponding pairs in a subscribers' cable 16. (The test block 12 may be one of a plurality of pedestal-mounted test blocks which serve as a test field for numerous subscribers' telephones.)

Since the test block 12 forms no part of the present invention, it will be considered only briefly herein. Basically, the test block 12 comprises a frame 18 carrying, for example, four parallel rows of electrical contacts connected to the central office and subscribers' cables 14 and 16. One row 20 of electrical contacts is shown fragmentarily in FIGS. 2 and 6.

The front tap shoe 10 has two parallel rows 22 of contact pins respectively engagable with the electrical contacts in two corresponding rows 20 on the test block 12. A fragment of one of the contact pin rows 22 is shown in engagement with a fragment of one of the electrical contact rows 20 in FIG. 6. The rows of contact pins 22 carried by the front tap shoe 10 will be discussed in more detail hereinafter.

The contact pins of the rows 22 on the front tap shoe 10 are connected by a cable 24 to connectors 26 which may be electrically engaged with a so-called "verifier" 28, or other cable verification test equipment. As will be understood, line pair verification is performed in the conventional manner by verifier rotary switch selection and subsequent line monitoring.

It will be understood that the contact pin rows 22 on the front tap shoe 10 are engaged with the electrical contact rows 20 of each pair on the test block 12. At the ends of each pair of electrical contact rows 20 on the test block 12 are laterally spaced frame elements 30, FIG. 7, having inturned lugs 32 which face each other. As will now be described, the front tap shoe 10 is secured to the test block 12, with the contact pin rows 22 in electrical engagement with two of the electrical contact rows 20, by engagement with the corresponding pairs of inturned lugs 32 at the ends of the frame 18 of the test block 12.

More particularly, the front tap shoe 10 comprises a generally rectangular housing 34 having ends 36, having a front side carrying the two rows 22 of contact pins, and having a rear side 38. At the ends 36 of the housing 34 are clamps 40 each engagable with a desired pair of the inturned lugs 32, as shown in FIGS. 6 and 7.

Figure 6:
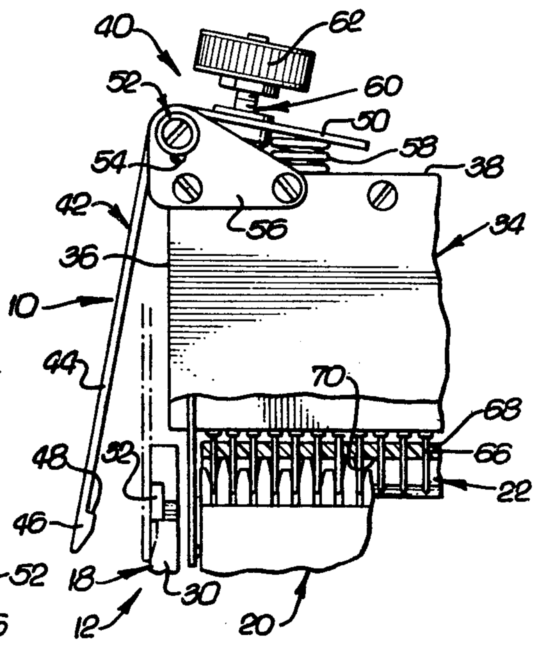
FIG. 6 is a fragmentary side elevational view similar to a portion of FIG. 2, but showing parts in different positions.
Figure 7:
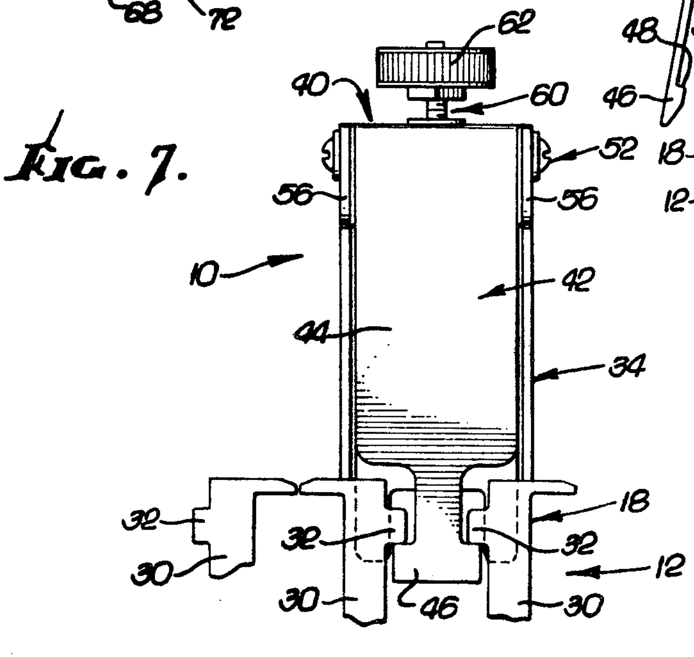
FIG. 7 is an end view of the front tap shoe of the invention showing it mounted on the test block, a fragment of the latter being shown.

Each clamp 40 comprises an L-shaped member 42 having a first arm 44 adjacent and overlying the corresponding end 36 of the housing 34 and terminating in a hook 46 engageble with a desired corresponding pair of the inturned lugs 32, as shown in FIGS. 6 and 7. More particularly, the hook 46 is T shaped to fit under the lugs 32, and has an inturned shoulder 48 also fitting under the lugs 32. The L-shaped member 42 of each clamp 40 also includes a second arm 50 overlying and spaced from the rear side 38 of the housing 34. The L-shaped member 42 carries at the junction of the arms 44 and 50 thereof, a transverse pin means 52, best shown in FIG. 2, extending transversely of and parallel to the corresponding housing end 36 and the rear side 38. The pin means 52 is received in elongated slot means 54 in bearing plates 56 carried by the housing 34, the slot means 54 being generally parallel to the corresponding end 36 of the housing 34.

A compression coil spring 58 interposed between the rear side 38 of the housing 34 and the second arm 50 of the corresponding L-shaped member 42 biases the first arm 44 toward the corresponding housing end 36, and biases the entire L-shaped member 42 rearwardly away from the rear side of the housing. Each clamp 40 includes a screw means 60 which is carried by the second arm 50 of the corresponding L-shaped member 42 and which is adapted to seat against the rear side 38 of the housing 34, the screw means 60 being actuable by a knob 62.

Considering the manner in which the clamps 40 are engaged with the test block 12, the contact pin rows 22 are brought into engagement with the desired pair of electrical contact rows 20, preferably with the screw means 60 loosened. Consequently, each L-shaped member 42 has two degrees of freedom. In other words, it is free to pivot about the axis of the corresponding pin means 52, and this pin means is free to move forwardly in the corresponding slot means 54 against the action of the corresponding spring 58. With this construction, the first arm 44 can be swung outwardly away from the corresponding housing end 36, as shown in FIG. 6, and the entire L-shaped member 42 can then be translated forwardly to permit insertion of the hook 46 behind the corresponding pair of lugs 32. In other words, the second degree of freedom of movement provided by the pin means 52 and the slot means 54 insures that the hook 46 of each clamp 40 can be engaged with the desired pair of test block lugs 32. It will be noted that, once such engagement of the hook 46 with the test block lugs 32 is achieved, the spring 58 biases the entire L-shaped member 42 outwardly to maintain such engagement until the L-shaped member is locked by rotating the screw means 60 until it bears tightly against the rear side 38 of the housing 34.

Thus, providing the two clamps 40 with two degrees of freedom, as hereinbefore described, facilitates engaging the front tap shoe 10 with the test block 12, which is an important feature. Subsequently, the shoe 10 is locked in place by the clamping screw means 60.

Figure 2:
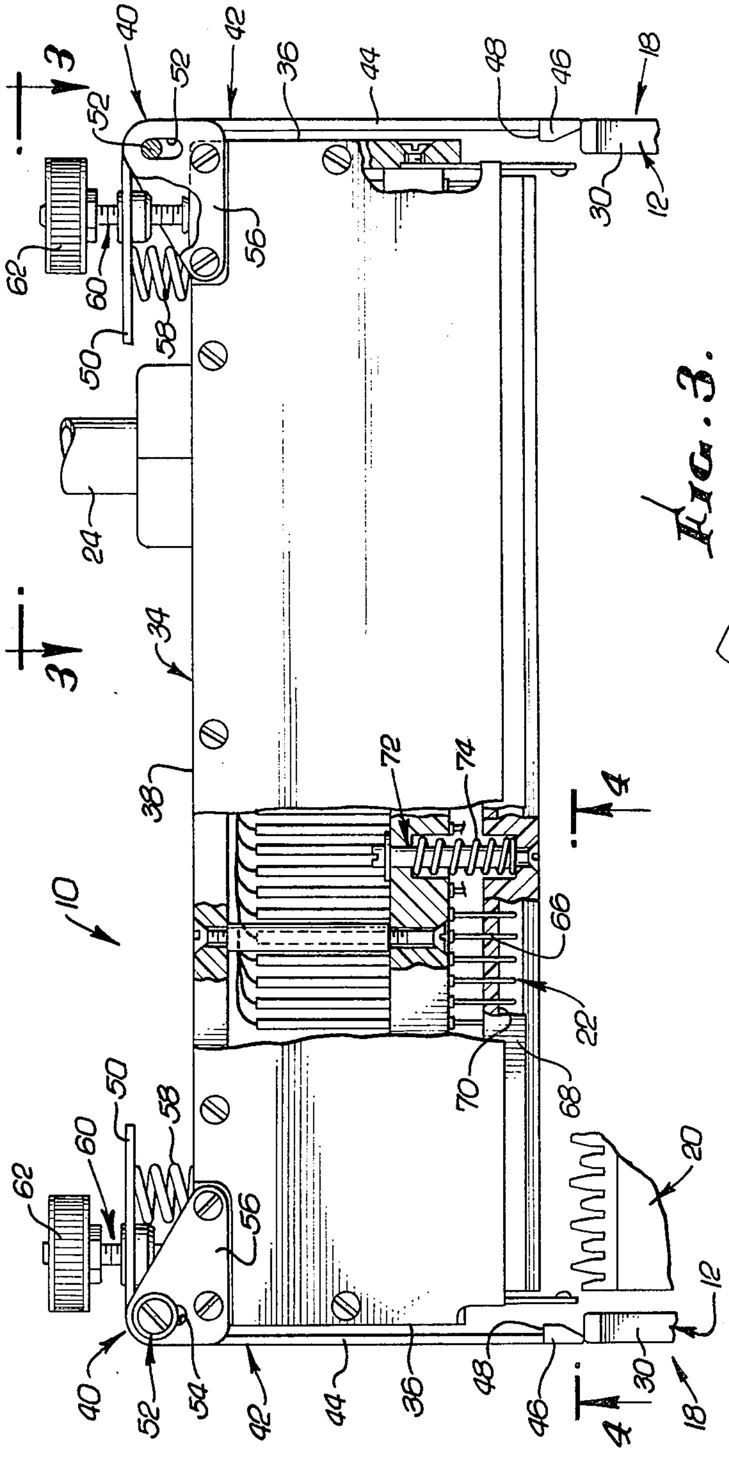
FIG. 2 is a side elevational view, partially in section, of the front tap shoe in position for mounting on the test block, which is shown fragmentarily.
Figure 3:
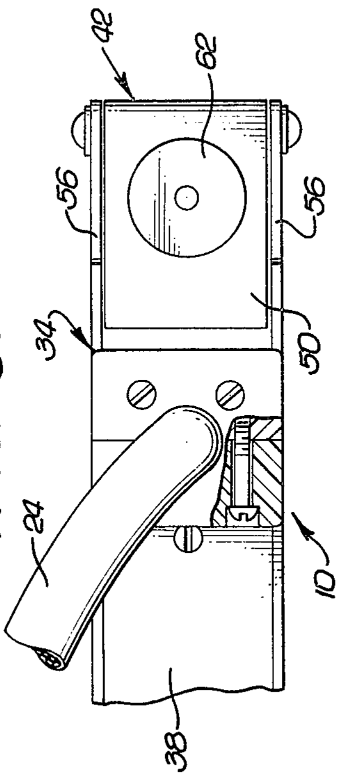
FIG. 3 is a fragmentary view, partially in section, showing a portion of the rear side of the front tap shoe, FIG. 2 being taken as indicated by the arrowed line 3—3 of FIG. 2.
Figure 4:
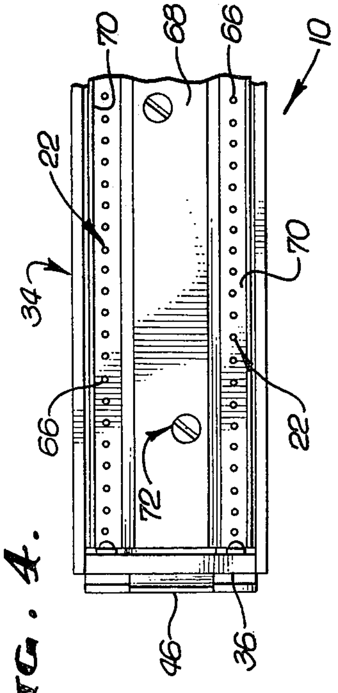
FIG. 4 is a fragmentary view, taken as indicated by the arrowed line 4—4 of FIG. 2, showing a portion of the front side of the front tap shoe of the invention.

Turning now to another aspect of the invention, it will be noted that the two rows 22 of contact pins extend through openings 66, best shown in FIGS. 2 and 6, in a guide plate 68 which extends the length of the front side of the housing 34. The guide plate 68 is provided with laterally spaced, parallel channels 70 in which the two rows of openings 66 are formed, respectively.

Figure 5:
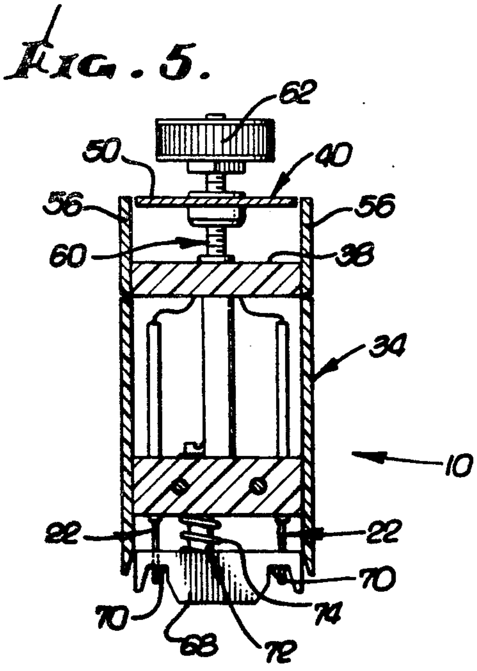
FIG. 5 is a transverse sectional view of the front tap shoe of the invention.

As best shown in FIGS. 2 and 5, the guide plate 68 is carried by a plurality of telescoping supports 72 which permit the guide plate to move between a retracted position, FIG. 6, and an extended position, FIGS. 2 and 5. Compression springs 74 encircling the telescoping supports 72 bias the guide plate 68 toward its extended position.

When the guide plate 68 is extended, the free ends of the rows 22 of contact pins are protected from damage within the channels 70, as best shown in FIG. 5 of the drawings. However, when the front tap shoe 10 is brought into engagement with the test block 12, the desired electrical contact rows 20 on the test block engage the guide plate 68 to retract it so that the contact pins in the rows 22 may enter and engage the electrical contacts in the desired rows 20. This occurs automatically, it being unnecessary to carry out any separate operation to retract the guide plate 68, which is an important feature.

It will be noted that the clamps 40 increase the length of the housing 34 of the front tap shoe 10 very little, as will be apparent from FIG. 2 of the drawings. Thus, the space required for shoe anchoring purposes is minimized, which is an important feature of the invention.

Although an exemplary embodiment of the invention has been disclosed for illustrative purposes, it will be understood that various changes, modifications and substitutions may be incorporated in such embodiment without departing from the invention as hereinafter claimed.

I claim as my invention:

1. A front tap shoe for mounting on a test block for telephone conductor pairs, or the like, the shoe comprising a generally rectangular housing having ends and having front and rear sides, the shoe being provided at its ends with clamps for engagement with the test block, each of said clamps including:

(a) an L-shaped member having a first arm adjacent and overlying the corresponding end of said housing and terminating in a hook, and having a second arm overlying and spaced from said rear side of said housing;
(b) mounting means connecting said L-shaped member to said housing and providing for pivotal movement of said member relative to said housing about a transverse axis paralleling the intersection of said rear side of said housing and the corresponding end of said housing, and for translational movement of said member relative to said housing in a direction generally parallel to the corresponding end of said housing;
(c) spring means between said second arm of said L-shaped member and said rear side of said housing for biasing said first arm of said member toward the corresponding end of said housing and for biasing said second arm of said member away from said rear side of said housing; and
(d) screw means carried by said second arm of said L-shaped member and engagable with said rear side of said housing.

2. A front tap shoe as defined in claim 1 wherein said mounting means for each of said L-shaped members includes pin means carried by said member and slot means carried by said housing and extending generally parallel to the corresponding end of said housing.

3. A front tap shoe as set forth in claim 1 wherein said hook of each of said clamps is generally T shaped and has an inturned shoulder.

4. In a front tap shoe for mounting on a telephone circuit test block, or the like, having parallel rows of electrical contacts, the combination of:

(a) a generally rectangular housing having a front side provided with two parallel rows of contact pins respectively engageable with the electrical contacts of two of the rows on the test block;
(b) a retractable guide plate overlying said front side of said housing and having two parallel rows of openings respectively receiving said rows of contact pins;
(c) means for biasing said guide plate forwardly relative to said housing from a retracted position to an extended position wherein it protects the ends of said contact pins; and
(d) said guide plate being provided with two parallel channels respectively having therein said rows of openings for said rows of contact pins, said channels receiving and protecting the ends of said contact pins in said extended position of said guide plate, and said channels receiving two of the rows of electrical contacts on the test block therein in the retracted position of said guide plate.

* * * * *